United States Patent
Anders et al.

(10) Patent No.: US 10,934,966 B2
(45) Date of Patent: Mar. 2, 2021

(54) COMBUSTION PHASING CONTROL FOR HIGH SUBSTITUTION LEAN BURN OF GASEOUS FUELS IN DUAL FUEL ENGINE

(71) Applicant: Caterpillar Inc., Deerfield, IL (US)

(72) Inventors: Jonathan W. Anders, Peoria, IL (US); Jason Jon Rasmussen, Hopewell, IL (US); Bobby John, Peoria (IN)

(73) Assignee: Caterpillar Inc., Peoria, IL (US)

( * ) Notice: Subject to any disclaimer, the term of this patent is extended or adjusted under 35 U.S.C. 154(b) by 53 days.

(21) Appl. No.: 16/279,564

(22) Filed: Feb. 19, 2019

(65) Prior Publication Data
US 2020/0263627 A1   Aug. 20, 2020

(51) Int. Cl.
*F02D 41/40* (2006.01)
*F02D 13/02* (2006.01)
*F02D 35/02* (2006.01)
*F02D 41/00* (2006.01)

(52) U.S. Cl.
CPC ....... *F02D 41/403* (2013.01); *F02D 13/0223* (2013.01); *F02D 35/028* (2013.01); *F02D 41/0025* (2013.01)

(58) Field of Classification Search
CPC ............. F02D 41/0027; F02D 41/3094; F02D 41/403; F02D 13/0223; F02D 13/0234; F02D 19/0647; F02D 19/081; F02D 19/10
See application file for complete search history.

(56) References Cited

U.S. PATENT DOCUMENTS

| | | | |
|---|---|---|---|
| 6,032,617 A | 3/2000 | Willi et al. | |
| 6,276,334 B1 | 8/2001 | Flynn et al. | |
| 6,505,601 B1 | 1/2003 | Jorach et al. | |
| 6,561,157 B2 | 5/2003 | zur Loye et al. | |
| 6,907,870 B2 | 6/2005 | zur Loye et al. | |
| 6,912,992 B2 * | 7/2005 | Ancimer | F02B 1/12 123/299 |
| 6,915,776 B2 | 7/2005 | zur Loye et al. | |
| 7,841,308 B1 | 11/2010 | Muth | |
| 8,327,823 B2 | 12/2012 | Courtoy et al. | |
| 8,555,852 B2 | 10/2013 | Munshi et al. | |
| 10,273,894 B2 | 4/2019 | Tripathi | |
| 2002/0017269 A1 * | 2/2002 | zur Loye | F02D 19/0631 123/295 |
| 2013/0146037 A1 | 6/2013 | Han et al. | |
| 2015/0068490 A1 * | 3/2015 | de Ojeda | F02D 21/08 123/27 R |
| 2015/0285178 A1 | 10/2015 | John | |

\* cited by examiner

*Primary Examiner* — Sizo B Vilakazi
*Assistant Examiner* — Anthony L Bacon
(74) *Attorney, Agent, or Firm* — Brannon Sowers & Cracraft

(57) ABSTRACT

A combustion control system for a dual fuel engine includes a combustion control unit structured to receive phasing data for combustion of a main charge of gaseous fuel ignited by way of pilot shots of a liquid fuel, output a pilot fueling command based on the phasing data, and output a valve timing command. The combustion control unit is further structured to vary a phasing of combustion of a main charge of a gaseous fuel ignited by pilot shots of a liquid fuel based on an adjustment to at least one of a pilot shot delivery parameter or a valve timing parameter such as intake valve closing timing from a first engine cycle to a second engine cycle. Control of the intake valve timing can be based on a main pilot shot timing error.

19 Claims, 5 Drawing Sheets

COMBUSTION PHASING CONTROL FOR HIGH SUBSTITUTION LEAN BURN OF GASEOUS FUELS IN DUAL FUEL ENGINE

TECHNICAL FIELD

The present disclosure relates generally to combustion control in a dual fuel engine system, and relates more particularly to varying a phasing of combustion of a main charge of gaseous fuel ignited by pilot shots of a liquid fuel.

BACKGROUND

Internal combustion engines are well known and widely used for vehicle propulsion, generation of electrical power, gas compression and liquification, liquid and gas transfer, and in various industrial applications. In a conventional operating scheme, fuel and air is combusted within an engine cylinder to produce a rapid rise in pressure and drive a piston coupled with a crankshaft. Spark-ignited engines typically employ a liquid petroleum distillate fuel such as gasoline, or certain gaseous fuels such as natural gas, methane, propane, and various mixtures. Compression-ignition engines typically utilize fuels such as diesel distillate fuel, biodiesel, and still others. There has been significant research interest in recent years in engines and operating strategies that are flexible with regard to fuel utilization, particularly gaseous fuels. Fuel prices can be fairly dynamic, and various fuels such as gaseous fuels can have desirable combustion or emissions properties which are sought to be exploited.

One type of engine design that allows for operation with different fuel types combines both a diesel distillate fuel and natural gas. Diesel alone is relatively easy to compression ignite, but can produce undesirable emissions. When natural gas is used as a fuel in a compression-ignition engine, the mixture of natural gas and air can fail to ignite, knock, or have combustion stability problems. These challenges can be especially acute in so-called lean burn applications where gaseous fuel and air are burned or attempted to be burned at a stoichiometrically lean equivalence ratio. Moreover, gaseous fuels can have a range of quality depending upon the type of gaseous fuel and its source. Gaseous fuels relatively richer in methane tend to compression ignite relatively less easily than those containing certain longer chain hydrocarbons, and, as a result, different fuel blends can have varying tendencies to knock, in other words prematurely ignite.

Dual fuel engines employing a combustion-initiating shot of liquid fuel to ignite a larger main charge of gaseous fuel can address some of these problems, making combustion relatively more predictable and controllable. It is generally desirable to utilize as little liquid fuel, such as diesel fuel, as is practicable in such applications since the diesel combustion even while small can still produce undesired emissions and have higher costs than the gaseous fuel. As combustion scientists have experimented with relatively tiny amounts of diesel fuel for igniting a larger charge of gaseous fuel, practical and commercial success has often proven elusive. One example of a dual fuel engine employing a diesel pilot fuel to ignite natural gas is known from U.S. Pat. No. 6,032,617 to Willi et al.

SUMMARY OF THE INVENTION

In one aspect, a combustion control system for a dual fuel engine includes a combustion sensor structured to produce phasing data indicative of a phasing of combustion in a cylinder in the dual fuel engine, and a combustion control unit coupled to the combustion sensor. The combustion control unit is structured to receive phasing data for combustion of a main charge of a gaseous fuel ignited by combustion of a plurality of pilot shots of a liquid fuel in the cylinder in a first engine cycle. The combustion control unit is further structured to output a pilot fueling command according to a pilot shot delivery parameter in a second engine cycle, based on the phasing data, and to output a valve timing command according to an intake valve timing parameter in the second engine cycle. The combustion control unit is still further structured to vary a phasing of combustion of a main charge of the gaseous fuel ignited by combustion of a plurality of pilot shots of a liquid fuel in the second engine cycle, based on an adjustment to at least one of the pilot shot delivery parameter or the valve timing parameter from the first engine cycle to the second engine cycle.

In another aspect, a dual fuel internal combustion engine system includes an engine housing having a cylinder and an intake conduit formed therein, and an intake valve movable between an open position and a closed position to fluidly connect and disconnect the cylinder with the intake conduit. The engine system further includes a gaseous fuel admission valve coupled with the engine housing and structured to admit a gaseous fuel for combustion in the cylinder, and an electronically controlled variable valve actuator coupled with the intake valve and structured to position the intake valve according to a valve timing parameter. The engine system still further includes at least one electronically controlled liquid fuel injector structured to directly inject a liquid fuel into the cylinder according to a pilot shot delivery parameter, and a combustion control unit. The combustion control unit is structured to receive phasing data for combustion of a main charge of a gaseous fuel ignited by combustion of a plurality of pilot shots of a liquid fuel in the cylinder in a first engine cycle, and adjust at least one of the pilot shot delivery parameter or the valve timing parameter from the first engine cycle to a second engine cycle. The combustion control unit is still further structured to vary a phasing of combustion of a main charge of the gaseous fuel ignited by combustion of a plurality of pilot shots of the liquid fuel in the second engine cycle, based on the adjustment to at least one of the pilot shot delivery parameter or the valve timing parameter.

In still another aspect, a method of operating a dual fuel internal combustion engine system includes producing phasing data indicative of a phasing of combustion of a main charge of a gaseous fuel ignited in a dual fuel engine by combustion of a plurality of directly injected pilot shots of a liquid fuel. The method further includes adjusting a pilot shot delivery parameter based on the phasing data, and varying an in-cylinder temperature in the dual fuel engine based on the adjustment to the pilot shot delivery parameter. The method still further includes varying a phasing of combustion of another main charge of the gaseous fuel ignited by combustion of a plurality of pilot shots of the liquid fuel based on the varying of the in-cylinder temperature.

DETAILED DESCRIPTION

Figure 1:
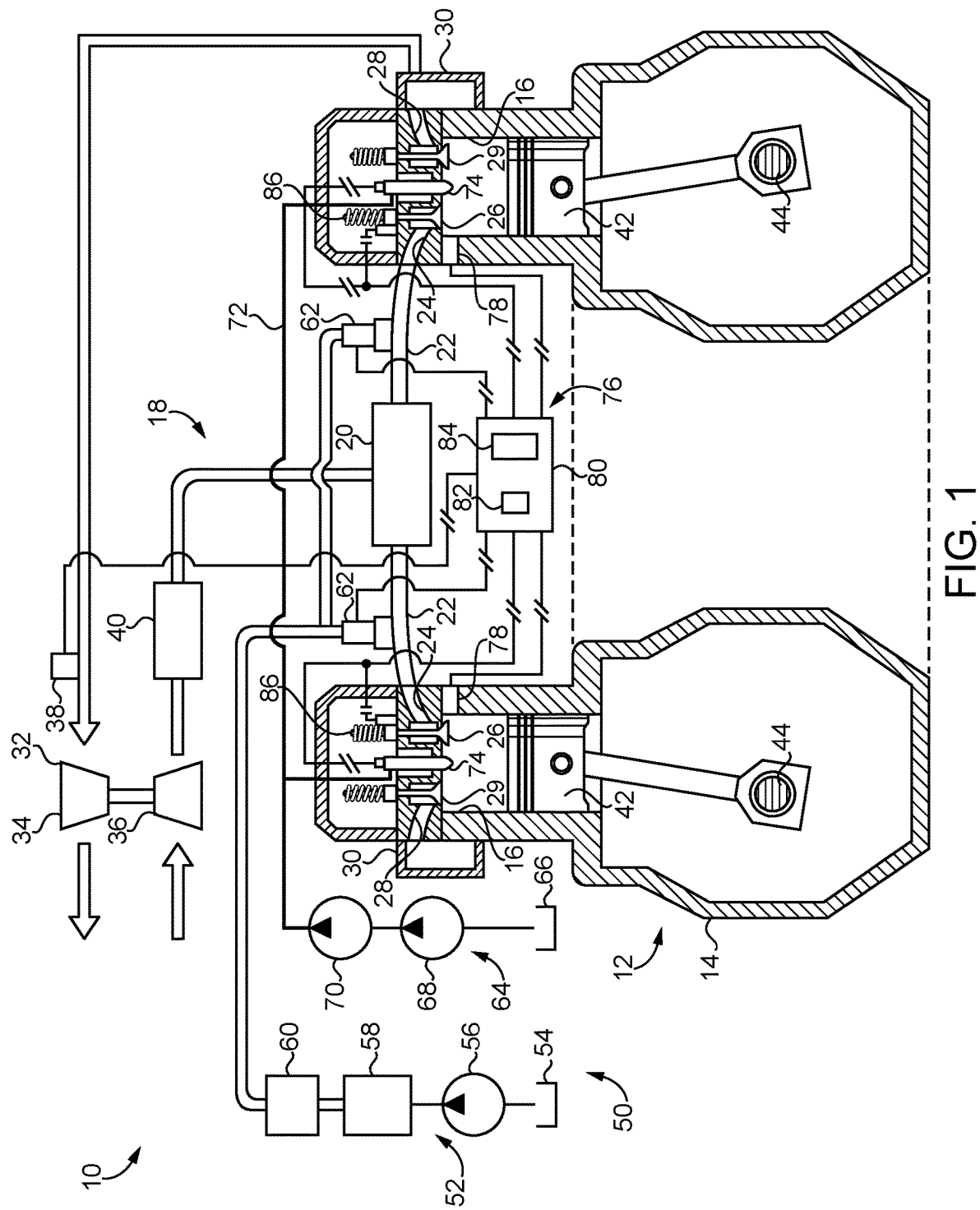
FIG. 1 is a partially sectioned side diagrammatic view of a dual fuel engine system, according to one embodiment.

Referring to FIG. 1, there is shown a dual fuel engine system 10 according to one embodiment, and including an internal combustion engine 12 having an engine housing 14 with a plurality of cylinders 16 formed therein. Internal combustion engine 12 (hereinafter "engine 12") can include a single cylinder, or multiple cylinders, arranged in an in-line configuration, a V-configuration, or in any other suitable arrangement. Discussion herein of a cylinder 16, or other elements or components, in the singular should be understood to refer generally to any of a plurality of those elements or components, except where otherwise indicated. A piston 42 is positioned at least partially within cylinder 16 and structured to reciprocate in response to combustion of fuel and air in cylinder 16 to rotate a crankshaft 44 in a generally known manner. Engine 12 will typically operate in a conventional four-cycle pattern.

Dual fuel engine system 10 further includes an intake system 18 having an intake manifold 20 fluidly connected with a plurality of intake runners 22 structured to feed air for combustion to each of cylinders 16. Engine housing 14 has an intake conduit 24 formed therein, and an intake valve 26 is movable between an open position and a closed position to fluidly connect and disconnect cylinder 16 with intake conduit 24. Engine housing 14 further has an exhaust conduit 28 formed therein, and engine 12 includes an exhaust valve 29 movable between an open position and a closed position to fluidly connect and disconnect cylinder 16 with exhaust conduit 28. Exhaust conduit 28 connects to an exhaust manifold 30 in a generally conventional manner. Dual fuel engine system 10 further includes a turbocharger 32 having a turbine 34 structured to receive a flow of exhaust gases from exhaust manifold 30, and operable to rotate a compressor 36 to compress intake air in intake system 18 for delivery to cylinder 16. An electronically controlled waste gate 38 may be positioned fluidly between exhaust manifold 30 and turbine 34 to enable exhaust to be selectively bypassed around or past turbine 34 in a manner that limits boost pressure produced by compressor 36. Waste gate 38 can be understood as an air-fuel ratio control element 38 that can be operated to selectively open to limit compression and therefore density of intake air, or closed to increase compression and therefore density of intake air supplied to cylinder 16 in a manner that generally enables air-fuel ratio to be controlled, the significance of which will be further apparent from the following description. Turbocharger 32 could be a first turbocharger with a second turbocharger positioned downstream of turbocharger 32, and dual fuel engine system 10 could potentially include a plurality of waste gates associated one with each of a plurality of turbines. In another embodiment, an intake airflow control element in the nature of a compressor bypass valve might be provided that enables intake air to bypass compressor 36 to analogously vary a relative pressurization of the intake air for controlling air-fuel ratio. An aftercooler 40 may be positioned downstream of compressor 36 and cools intake air to be supplied to intake manifold 20. Although not shown, engine system 10 could include apparatus for recirculating exhaust.

Dual fuel engine system 10 further includes a dual fuel system 50 having a gaseous fuel subsystem 52 with a gaseous fuel supply 54. Fuel supply 54 could include a cryogenic liquified gaseous fuel supply storing liquified natural gas or another suitable fuel that is gaseous at standard temperature and pressure, such as methane, ethane, biogas, landfill gas, or still another. As further discussed herein dual fuel engine system 10 can be structured to operate at a stoichiometrically lean equivalence ratio of gaseous fuel to air, and further being structured to operate on gaseous fuel having a range of quality including gaseous fuels having a methane number less than 70, potentially less than 60 or still lower, for example. Dual fuel engine system 10 may further be structured to operate at liquid fuel substitution rates greater than 95%, and potentially greater than 99%. The liquid fuel used in dual fuel engine system 10 can include diesel distillate fuel, however, the present disclosure is not thereby limited. Gaseous fuel subsystem 52 can further include a cryogenic pump 56, structured to convey gaseous fuel in a liquified state to a vaporizer 58, which thenceforth supplies the gaseous fuel now in a gaseous state to a pressurization pump 60. Other gaseous fuel supply and vaporization equipment could be used different from that depicted in FIG. 1. Gaseous fuel pressurization pump 60 feeds the gaseous fuel to a gaseous fuel admission valve 62 coupled with engine housing 14 and structured to admit the gaseous fuel for combustion in cylinder 16. In the illustrated embodiment a plurality of gaseous fuel admission valves 62 are shown each coupled with an intake runner 22, enabling gaseous fuel supply to be independently varied amongst the plurality of cylinders 16. In other embodiments, gaseous fuel could be admitted to intake manifold 20, or in some instances potentially mixed with intake air upstream of compressor 36.

Dual fuel engine system 10 further includes a liquid fuel subsystem 64 for supplying the liquid fuel and having a liquid fuel supply 66, such as a fuel tank, a fuel transfer pump 68, and a fuel pressurization pump 70. Fuel pressurization pump 70 can supply liquid fuel at a pressure suitable for injection to a common rail 72 or similar common reservoir structured to store a volume of pressurized liquid fuel. In other instances, rather than a common rail so-called unit pumps or the like could be used and each associated with one or more of the plurality of cylinders 16. Common rail 72 feeds pressurized liquid fuel to a plurality of electronically controlled liquid fuel injectors 74 structured to directly inject the liquid fuel into each of the plurality of cylinders 16 as further discussed herein. In the illustrated embodiment one electronically controlled liquid fuel injector is associated with each cylinder 16, however, in other instances each cylinder 16 could be equipped with a plurality of liquid fuel injectors including, for example, a first liquid fuel injector for injecting relatively small pilot quantities of liquid fuel into cylinder 16 during dual fuel operation, and a second liquid fuel injector structured to inject the liquid fuel into cylinder 16 during a diesel-only mode of operation. Cylinder 16 will be equipped with at least one electronically controlled liquid fuel injector.

Dual fuel engine system 10 further includes a combustion control system 76. Combustion control system 76 includes a combustion sensor structured to produce phasing data indicative of a phasing of combustion in cylinder 16 in engine 12. The phasing data may be indicative of a phasing of combustion of a main charge of gaseous fuel ignited by way of a plurality of pilot shots of liquid fuel in an engine cycle. Combustion control system 76 can further be understood to include waste gate 38, or a separate electrical actuator (not shown) for waste gate 38, as well as the various electrical actuators that are associated with gaseous fuel admission valve 62, and liquid fuel injector 74. Combustion control system 76 also includes an electronically controlled variable valve actuator 86 coupled with intake valve 26 and structured to position intake valve 26 to vary a relative position and state of intake valve 26 from engine cycle to engine cycle as further discussed herein. Combustion control system 76 further includes an electronic control unit or combustion control unit 80 coupled to combustion sensor 78 and the other electronically controlled components and sensors of dual fuel engine system 10. In one practical implementation strategy combustion sensor 78 can include a pressure sensor exposed to a fluid pressure of cylinder 16 and including a pressure sensor of a generally known type having a deformable element, or a strain gauge or the like, having an electrical state such as a voltage or a resistance that varies in response to varying of pressure within cylinder 16. Combustion sensor 78 could be mounted within a cylinder block or within a cylinder head of engine 12 in a generally known manner. Combustion control unit 80 may be structured to receive signals output by combustion sensor 78, or structured to interrogate combustion sensor 78, or otherwise receive electronic data produced by combustion sensor 78, for the control purposes further discussed herein. The phasing data produced by combustion sensor 78 may be data encoded in a fluid pressure signal or a mechanical strain signal or the like. Combustion control unit 80 includes a data processor 82 coupled with a computer readable memory 84. Data processor 82 can be any suitable central processing unit such as a microprocessor or a microcontroller or a field programmable gate array, for instance. Computer readable memory 84 can likewise include any suitable computer readable memory such as RAM, ROM, DRAM, SDRAM, FLASH, a hard drive, or still another. Memory 84 can include recorded thereon computer executable program instructions for operating dual fuel engine system 10, as well as the various maps referenced during execution of control routines according to the present disclosure.

Figure 2:
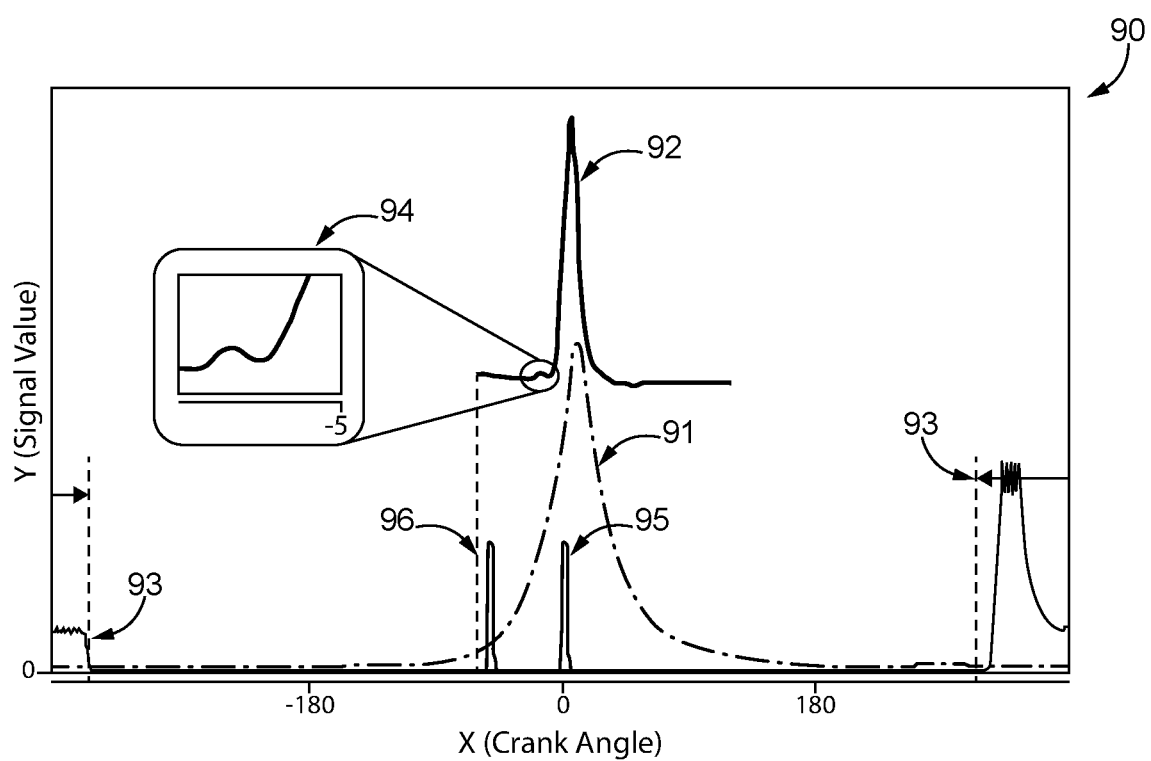
FIG. 2 is a graph illustrating combustion characteristics in a dual fuel engine, according to one embodiment.

Referring also now to FIG. 2, there is shown a graph 90 illustrating aspects of dual fuel operation according to one embodiment. In graph 90, crank angle is shown on the X-axis corresponding to a total of about 720° or two crank rotations. A top dead center position of piston 42 occurs at 0°. Intake valve closing occurs at about minus 60° crank angle but can be varied from engine cycle to engine cycle as further discussed herein. Signal value is shown on the Y-axis for several different operating aspects, including cylinder pressure at a curve 91, heat release at a curve 92, port fuel injection of gaseous fuel at a curve 93, and diesel pilot shots at curves 95 and 96. A detail up to about 5° prior to a top dead center position is shown at 94. According to the present disclosure a plurality of pilot shots of liquid fuel, for example two, can be directly injected into cylinder 16 to ignite a main charge of the gaseous fuel. Shot 96 can be understood as an early pilot shot, with shot 95 being understood as a main pilot shot. It can be noted from detail 94 that an increase in heat release based on an initial relatively slow and cool combustion by compression-ignition of early pilot shot 96 is observed. It is believed that this initial, relatively slow and cool combustion of the early pilot can produce a combustion flame generally radially outward close to a periphery of cylinder 16 and piston 42, as piston 42 is traveling toward its top dead center position. Main pilot shot 95 can be delivered at a crank angle close to the top dead center position to produce another combustion flame that merges with the early pilot combustion flame to trigger conditions that rapidly ignite the lean main charge of gaseous fuel. This general combustion approach is different from certain earlier strategies, such as so-called homogeneous charge or others, that do not rely upon diffusion burning, or otherwise non-homogeneous charge burning, of multiple pilot shots to ignite a gaseous fuel main charge, nor vary the timing, quantity, or other characteristics of pilot shots to control phasing of combustion of a main charge as further discussed herein. Early pilot shot 96 can be injected at a timing that follows shortly after the late intake valve closing timing. It is further believed that the late intake valve closing timing, which can be varied for example from about 60° to about 50° before a top dead center position of piston 42 assists in producing a relatively slow and cool diesel combustion to produce low levels of certain emissions. As will be further apparent from the following description, cycle to cycle adjustments to a valve timing parameter such as the intake valve closing timing, and/or to a pilot shot delivery parameter such as pilot shot injection timing, pilot shot injection amount, or a relative distribution of injection amounts between early pilot shot 96 and main pilot shot 95, in other words a pilot shot-to-shot fuel split, allows combustion of the main charge to be controlled in a manner that is successful for controlling a phasing of combustion of lean mixtures at high substitution rates with a desirable emissions profile. Controlling intake valve closing timing can vary effective compression ratio, thus varying in-cylinder temperature. Such an approach avoids producing higher pressures and thus temperatures that can lead to premature ignition of the main gaseous fuel charge or knock. As discussed herein, the adjustments to intake valve closing timing, including an adjustment from a first late closing timing in a first engine cycle to a second late closing timing in a second engine cycle, and thus varying of in-cylinder temperature, may be based on an adjustment to the pilot shot delivery parameter. Late intake valve closing means a closing timing occurring after a bottom dead center position of piston 42. Other methods for varying in-cylinder temperature are contemplated such as varying boost pressure or charge air cooling. The present disclosure provides practical operating strategies that do not employ exhaust gas recirculation, however, where exhaust gas recirculation is used varying cooling of recirculated exhaust could also be employed to vary in-cylinder temperatures. From a first engine cycle to a second engine cycle, phasing of combustion can be varied based on an adjustment to at least one of the pilot shot delivery parameter or the valve timing parameter. As further discussed herein, the pilot shot delivery parameter can be adjusted from a first engine cycle to a second engine cycle based on the phasing data. The valve timing parameter can be adjusted from a first engine cycle to a second engine cycle based on the adjustment to the pilot shot delivery parameter. According to present regulatory requirements and expectations, dual fuel engine system 10 may be operated without the need for any exhaust aftertreatment to reduce oxides of nitrogen (NOx) or smoke.

Figure 3:
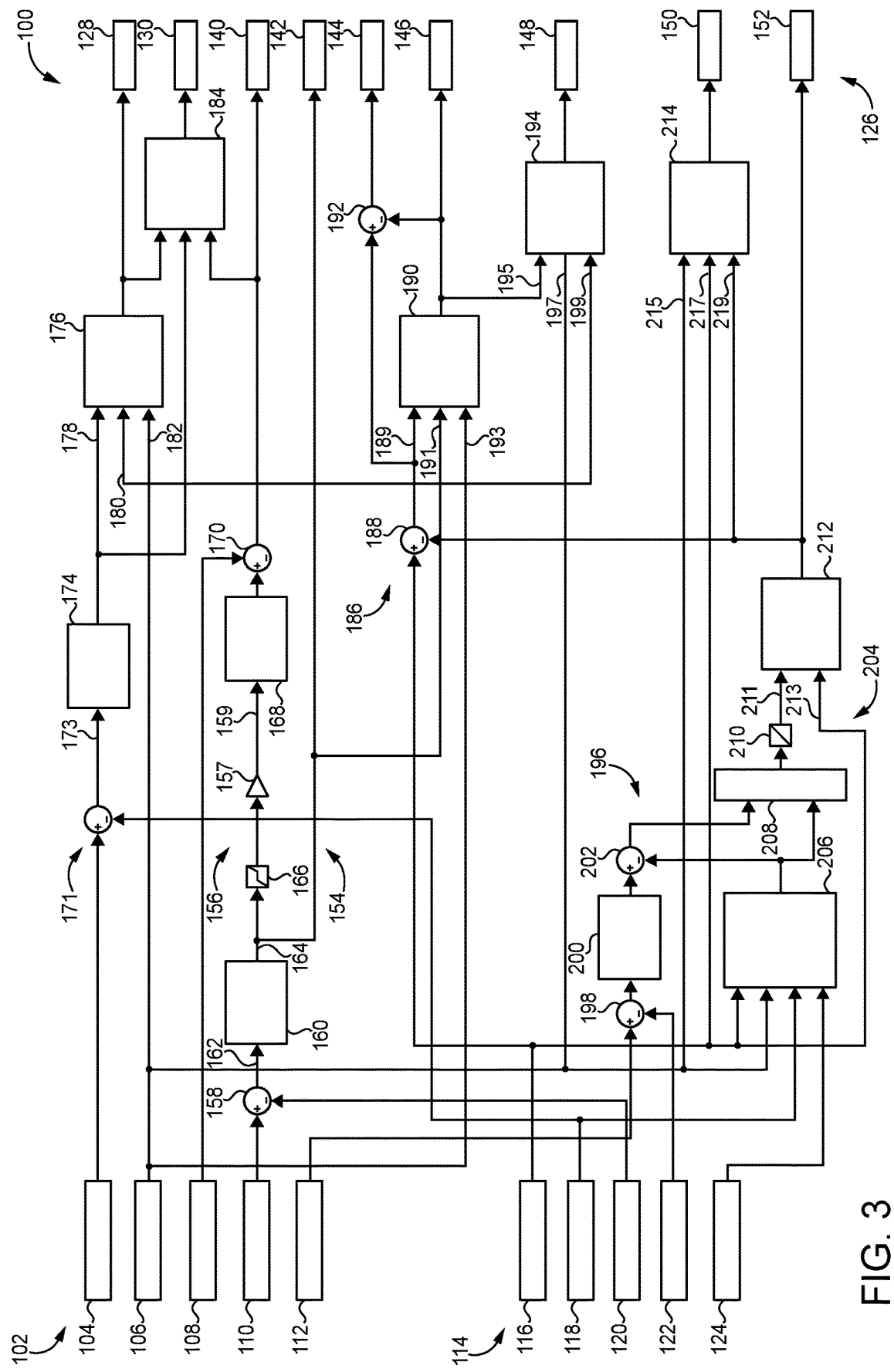
FIG. 3 is a control diagram for controlling a dual fuel engine system, according to one embodiment.

Referring also now to FIG. 3, there is shown a control diagram 100 according to one embodiment, and illustrating a plurality of control targets at 102, feedback signals and inputs at 114, and outputs or commands at 126. Control targets 102 can include a target lambda 104, a target engine speed 106, a target intake valve actuation or IVA 108, a target crank angle 50% total fuel charge burn location (CA50) 110, and a maximum peak cylinder pressure (MaxPCP) 112. Signals/inputs 114 can include a total fuel from governor input 116, a lambda input 118, CA50 input 120, a peak cylinder pressure (PCP) input 122, and an intake manifold air temperature (IMAT) input 124.

The CA50 input 120 is or includes the phasing data as discussed herein. Other targets and feedback than a crank angle 50% burn location could be used to objectively characterize phasing of combustion for the control purposes contemplated herein. Outputs/commands 126 can include a waste gate 1 command 128, a waste gate 2 command 130, an intake valve actuation (IVA) command 140, a main pilot shot timing command 142, a main pilot shot quantity command 144, an early pilot shot quantity command 146, an early pilot shot timing command 148, a rail pressure command 150, and a gaseous fueling command 152. Early pilot shot quantity command 146, which could include or be the basis for an injection duration, affects a relative amount of liquid fuel allocated to the early pilot shot and thus can vary shot-to-shot fuel split, as further discussed herein. Control diagram 100 further includes a main pilot shot timing calculation 154, an intake valve actuation calculation 156, a peak cylinder pressure calculation 196, a gaseous fueling calculation 204, and a waste gate calculation 171. The various calculations are performed by combustion control unit 80, or multiple control units, to control combustion and combustion phasing in dual fuel engine system 10. It will be recalled that one of targets 102 is target CA50 110. Target 110 can be understood as a target crank angle at which 50% of delivered fuel, or 50% of a main charge, has been burned. An adder 158 determines a difference between target CA50 110 and an observed CA50 as indicated by signal 120, thus calculating a control term or raw error 162. A proportional control such as a PID control 160 outputs a compensated control term 164 based on raw error 162. The compensated control term 164 can be used as the basis for outputting main pilot shot timing command 142. The compensated control term 164 can also serve as the basis for IVA command 140 in calculation 156. IVA command or valve timing command 140 can be determined, to adjust intake valve closing timing, according to a time scale different from a time scale of determining any of commands 142, 144, 146, or 148, which can each be understood as a pilot fueling command. Calculation 156 can include a wait cycle or dead zone 166, a gain 157, and another proportional control such as another PID control 168. An adder 170 determines a difference between the output of PID control 168 and target IVA 108. Calculation 156 can further be understood to determine an intake valve actuation error at adder 170 that serves as the basis for IVA command 140. It will be recalled that control term 164 is based on a difference or error between target CA50 110 and the observed CA50 120. IVA command 140 is thus understood to be based on a pilot shot error, which can be a main pilot timing error. Still another way to understand calculations 154 and 156 is that combustion control unit 80 is adjusting a main pilot shot timing and the other pilot fuel delivery parameters in a relatively faster control loop calculation, and determining a valve timing for intake valve 26, such as a valve closing timing, or adjusting another parameter that varies in-cylinder temperature, based on the main pilot timing error in a relatively slower control loop calculation. Main pilot timing can be used as a principal control for varying phasing of combustion and can be adjusted from a first engine cycle to a second engine cycle. Where main pilot shot error becomes too large, such as where main pilot shot timing has drifted father than desired from a top dead center crank angle location, valve timing adjustment can bring main pilot shot timing back closer to top dead center.

In addition to main pilot shot timing serving as a basis for varying phasing of combustion, other characteristics of pilot shot delivery can be adjusted from one engine cycle to another as discussed herein to also affect phasing of combustion. Combustion control unit 80 can thus be understood to output a pilot fueling command, or multiple pilot fueling commands, according to a pilot shot delivery parameter that includes the at least one of a pilot shot timing, a pilot shot amount, or a pilot shot-to-shot fuel split. Typically the adjustment to the pilot shot delivery parameter will vary characteristics of each of a plurality of pilot shots simultaneously. The pilot shot timing can include a main pilot shot timing, and the pilot shot-to-shot fuel split may be a fuel split between a main pilot shot and an early pilot shot. Each of main pilot shot timing and early pilot shot timing, and pilot shot-to-shot fuel split, can be adjusted from engine cycle to engine cycle. The adjustment to each of the main pilot shot timing and the adjustment to the early pilot shot timing can be the same adjustment in terms of degrees of crank angle, thus these parameters are adjusted together. The pilot fueling command can be based on the phasing data produced by combustion sensor 78. Combustion control unit 80 can further be understood to output a valve timing command according to an intake valve timing parameter, which can include a late closing timing. Calculation 186 in control diagram 100 addresses the adjustment of the pilot shot delivery parameter where pilot shot-to-shot fuel split and early pilot timing are adjusted from one engine cycle to another. An adder 188 receives a total fuel from governor input 116, calculates a difference between the total fuel from governor and a gas quantity calculated at 212, to produce a diesel fueling control term 189 that is input to a diesel split map 190. Diesel split map 190 also has as coordinates a main timing input 191, and an engine speed input 193. An output from map 190 serves as the basis for early pilot quantity command 146. An adder 192 determines a difference between the early pilot quantity and the diesel fuel amount to produce main pilot shot quantity command 155. Another map 194 is used to determine early pilot timing command 148 based on the early pilot quantity amount, engine speed, and an intake valve closing timing as inputs 195, 197, and 199, respectively.

Calculation 196 includes an adder 198 that determines a difference between max PCP target 112 and the observed PCP 112, which difference is input to a proportional control such as a PID 200. The output of proportional control 200 and a max substitution output from a max substitution map 206 are processed at an adder 202. Max substitution map 206 calculates the max substitution, rate for example, based on input 116, target speed 106, lambda 118, and IMAT input 124. A min/max limiter 208 receives inputs from adder 202 and map 206. An output of min/max limiter 208 is processed at a rate limiter 210. Gas quantity calculation 212 can include a map calculation based on a substitution amount output 211 of rate limiter 210 and a total fuel input 213. An output of gas quantity calculation 212 serves as a basis for gas command 152.

Calculations 171 determine waste gate 1 command 128, and optionally waste gate 2 command 130 if a second waste gate and second turbine stage are used, and can include an adder 172 that determines a difference between target lambda 104 and observed lambda 118, with a lambda error 173 processed at a waste gate proportional control such as a PID 174. The output of PID control 174 can include a waste gate command term 178, which is inputted to a waste gate surge map 176 along with an intake valve closing timing input 180 and an engine speed input 182, to produce waste gate 1 command 128. Another waste gate surge map 184 determines waste gate 2 command 130 if used. By way of calculations 171, combustion control unit 80 adjusts waste gate 38 based on intake valve closing timing to ensure air to fuel ratio (AFR) remains suitable for stoichiometrically lean combustion of the main charge of gaseous fuel.

INDUSTRIAL APPLICABILITY

From the foregoing description it will be appreciated that there are a number of different control "knobs" representing different parameters that can be adjusted from a first engine cycle to a second engine cycle to vary a phasing of combustion. It will also be recalled that differing fuel quality, such as differing methane number among different fuel blends, can affect combustion characteristics. For instance, relatively more easily compression-ignited propane present in a fuel blend of mostly methane can prematurely ignite, causing engine knock, for instance. Phasing control according to the present disclosure enables adjustments to intake valve timing such as intake valve closing as well as adjustments to pilot fuel delivery to correct or prevent excursions in phasing of combustion such as might be observed where fuel quality supplied to engine 12 changes, either because fuel supplies are deliberately shifted from one fuel supply to another, or because a supply of fuel is inconsistent in fuel quality over time. This capability is considered to provide advantages over known strategies which are often purpose built and tuned for a particular fuel quality. It will also be appreciated that such limitations respecting fuel quality are typically most acute at high substitution rates and at stoichiometrically lean equivalence ratios.

Figure 4:
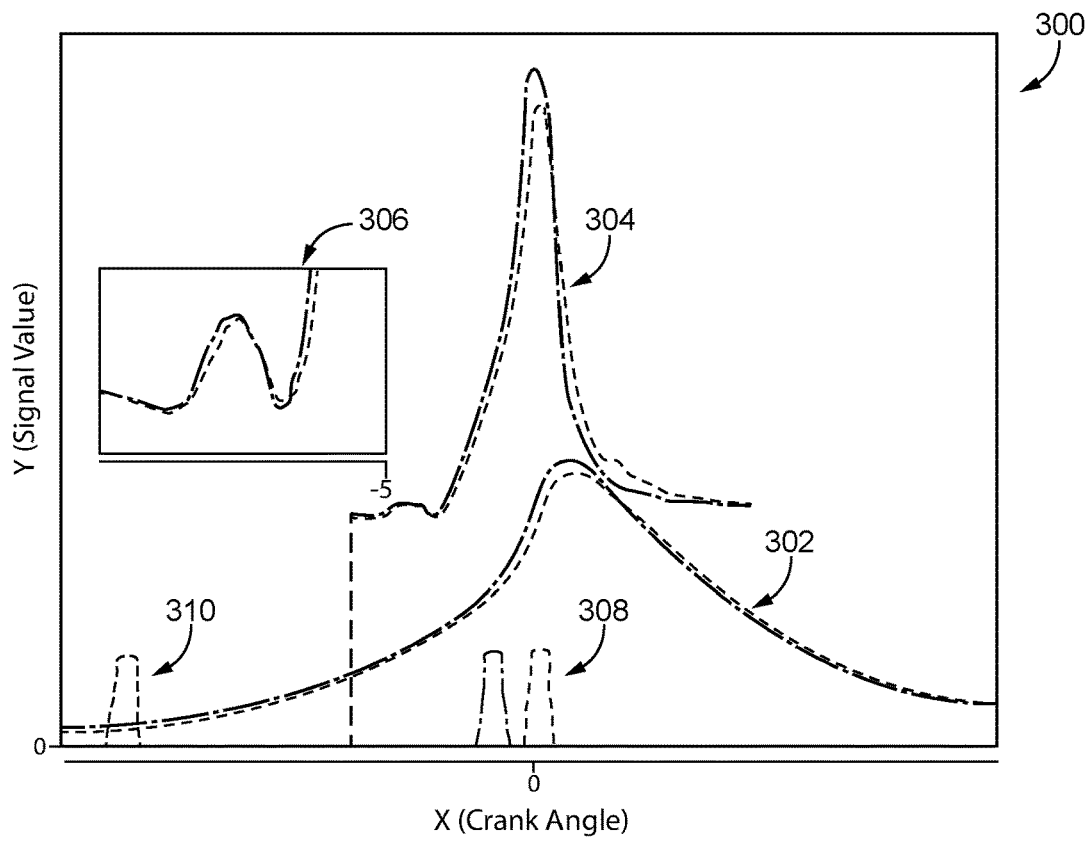
FIG. 4 is a graph illustrating combustion phasing characteristics varied in response to adjustment to a main timing parameter.

Referring also now to FIG. 4, there is shown a graph 300 illustrating example varying of a phasing of combustion that can occur in response to adjusting a main pilot shot timing. In graph 300, cylinder pressure is shown at a curve 302, and heat release shown at a curve 304, with a detail 306 of heat release prior to about 5° before top dead center. An early pilot shot is shown at 310, and earlier and later main pilot shots are both shown generally at 308. Curves 302 and 304 each include lines shown in patterns consistent with the patterns used in pilot shots 308 to which they correspond. A similar convention is used in the other graphs discussed below. It can be noted that a relatively later main pilot shot timing is generally associated with cylinder pressure that is shifted later and heat release that is shifted later, in comparison to an earlier main pilot shot timing. From FIG. 4 it will be further understood that as main pilot shot timing retards, combustion phasing retards, combustion duration increases, and peak cylinder pressure decreases. Retarding main pilot shot timing can be associated with increased emissions of unburned hydrocarbons and carbon monoxide, but generally consistent results respecting smoke output.

Figure 5:
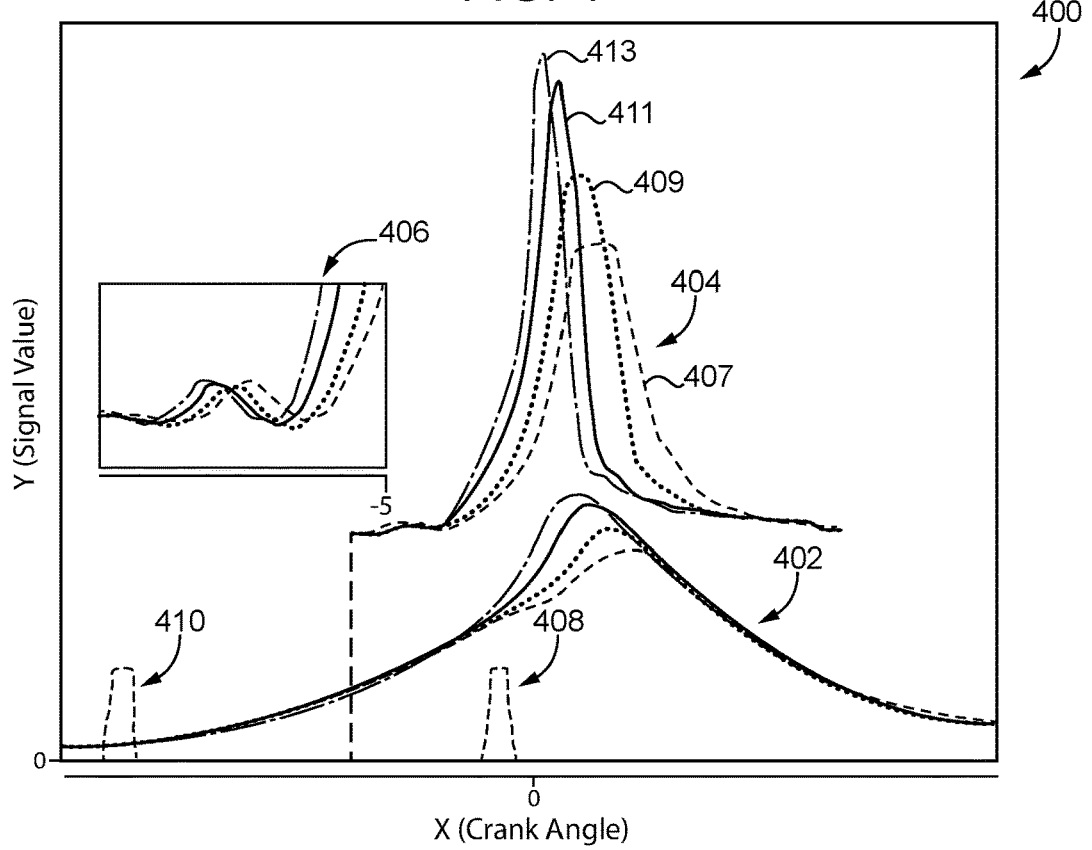
FIG. 5 is a graph illustrating combustion phasing characteristics varied in response to adjustment to a valve timing parameter.

Referring now also to FIG. 5, there is shown another graph 400 illustrating example varying of phasing of combustion in response to adjusting intake valve closing timing, and including cylinder pressure at a curve 402, heat release at a curve 404, a detail up to about 5° before top dead center at 406, an early pilot shot at 410, and a main pilot shot at 408. A first heat release trace 407 corresponds to a latest intake valve closing timing, a second heat release trace 409 corresponds to an earlier intake valve closing timing, a third heat release trace 411 corresponds to a still earlier intake valve closing timing, and a fourth heat release trace 413 corresponds to a still earlier intake valve closing timing. Traces 407, 409, 411 and 413 correspond to intake valve closing timings of about 76°, 88°, 95° and 105°, respectively, before top dead center. It can be noted that as intake valve closing retards, combustion phasing retards, combustion duration increases, and peak cylinder pressure decreases. NOx production may decrease whereas unburned hydrocarbons and carbon monoxide may increase, with smoke output remaining relatively constant, as intake valve closing timing retards. It should further be understood that adjustments to the intake valve timing parameter, e.g. intake valve closing timing, can provide relatively dramatic changes to combustion phasing in comparison to adjustments to main pilot shot amount, or pilot shot-to-shot fuel split, and thus reduce an error of the main pilot shot timing. Hence, varying intake valve timing can be understood as a rougher adjustment control knob, whereas varying main pilot shot timing can be understood as a finer adjustment control knob. According to the present disclosure, in some instances each of main timing and fuel split, and also potentially early pilot timing, will be adjusted from a first engine cycle to a second engine cycle, increasing the relative impact of adjusting the pilot shot delivery parameter from a first engine cycle to a second engine cycle. For instance, based on phasing data for a first engine cycle, combustion control unit 80 can adjust the pilot shot delivery parameter from a first main pilot timing and a first shot-to-shot fuel split to a second main pilot shot timing, advanced or retarded relative to the first main pilot shot timing, and a second shot-to-shot fuel split, with relatively more or less of the liquid fuel allocated to the early pilot shot in the second engine cycle than in the first engine cycle. It will be recalled that retarding main timing retards phasing of combustion, and advancing main timing advances phasing of combustion. Effects of adjusting fuel split are discussed in connection with FIG. 6 below.

Figure 6:
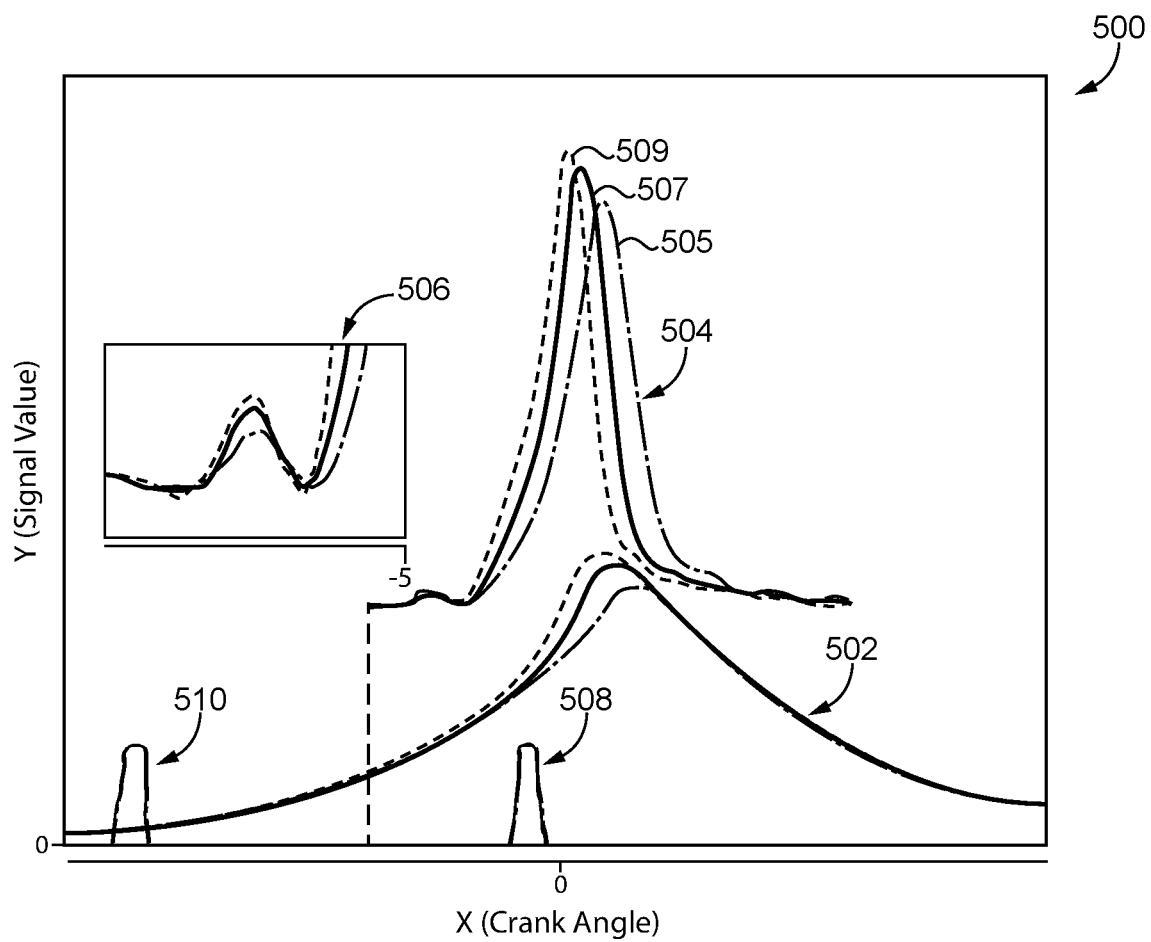
FIG. 6 is a graph illustrating combustion phasing characteristics varied in response to adjustment to an early pilot quantity parameter.

Referring now to FIG. 6, there is shown another graph 500 illustrating an effect on combustion phasing of adjusting early pilot injection quantity, effectively adjusting fuel split. Cylinder pressure is shown at a curve 502, heat release at a curve 504 with a detail up to about 5° before top dead center at 506, a main pilot shot at 508, and an early pilot shot at 510. Traces 505, 507, and 509 correspond to early pilot shot quantities that are produced by varying injection durations of about 350 microseconds, 360 microseconds, and 370 microseconds, respectively, at consistent rail pressure. It can be noted generally that as early pilot duration/quantity increases, combustion phasing advances, combustion duration decreases, and peak cylinder pressure increases. NOx production may also increase with increased early pilot duration/quantity, whereas unburned hydrocarbons and carbon monoxide output may decrease, and smoke production remain approximately the same. It will be recalled that main timing and fuel split may be adjusted together. In map 190 in control diagram 100, an early pilot quantity is mapped to main shot timing. As calculation 154 adjusts main shot timing early pilot quantity will naturally be adjusted. Adder 192 can compensate the main shot quantity based on adjustments to the early pilot quantity. It should be appreciated that any of these individual pilot shot fueling characteristics could be independently manipulated, however, the present strategy linking main shot timing with fuel split is considered to advantageously optimize the impact of available control knobs for phasing control.

The present description is for illustrative purposes only, and should not be construed to narrow the breadth of the present disclosure in any way. Thus, those skilled in the art wilt appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A combustion control system for a dual fuel engine comprising:
    a combustion sensor structured to produce phasing data indicative of a phasing of combustion in a cylinder in the dual fuel engine;
    a combustion control unit coupled to the combustion sensor, the combustion control unit being structured to:
    receive phasing data for combustion of a main charge of a gaseous fuel ignited by combustion of a plurality of pilot shots of a liquid fuel in the cylinder in a first engine cycle;
    output a pilot fueling command according to a pilot shot delivery parameter in a second engine cycle, based on the phasing data;
    output a valve timing command according to an intake valve timing parameter in the second engine cycle;
    vary a phasing of combustion of a main charge of the gaseous fuel ignited by combustion of a plurality of pilot shots of the liquid fuel in the second engine cycle, based on an adjustment to at least one of the pilot shot delivery parameter or the valve timing parameter from the first engine cycle to the second engine cycle; and
    determine the pilot fueling command in a first loop calculation, and determine the valve timing command in a second loop calculation nested with the first loop calculation.

2. The combustion control system of claim 1 wherein the intake valve timing parameter includes a late closing timing.

3. The combustion control system of claim 1 wherein the combustion control unit is further structured to calculate a pilot shot error, and to output the valve timing command based on the pilot shot error.

4. The combustion control system of claim 3 wherein the pilot shot error includes a main pilot timing error based on a difference between a main pilot timing and a target timing.

5. The combustion control system of claim 1 wherein the adjustment to the pilot shot delivery parameter varies each of a main pilot shot and an early pilot shot from the first engine cycle to the second engine cycle, and includes at least one of a pilot shot timing, a pilot shot quantity, or a pilot shot-to-shot fuel split.

6. The combustion control system of claim 5 wherein the pilot shot delivery parameter includes a main pilot shot timing and a pilot shot-to-shot fuel split between a main pilot shot and an early pilot shot.

7. The combustion control system of claim 6 wherein an early pilot shot quantity is mapped to the main pilot shot timing.

8. The combustion control system of claim 1 wherein the first loop calculation is a faster loop calculation, and the second loop calculation is a slower loop calculation.

9. A dual fuel internal combustion engine system comprising:
    an engine housing having a cylinder and an intake conduit formed therein;
    an intake valve movable between an open position and a closed position to fluidly connect and disconnect the cylinder with the intake conduit;
    a gaseous fuel admission valve coupled with the engine housing and structured to admit a gaseous fuel for combustion in the cylinder;
    an electronically controlled variable valve actuator coupled with the intake valve and structured to position the intake valve according to a valve timing parameter;
    at least one electronically controlled liquid fuel injector structured to directly inject a liquid fuel into the cylinder in a main pilot shot and an early pilot shot, according to a pilot shot delivery parameter; and
    a combustion control unit structured to:
    receive phasing data for combustion of a main charge of a gaseous fuel ignited by combustion of a plurality of pilot shots of a liquid fuel in the cylinder in a first engine cycle;
    adjust at least one of the pilot shot delivery parameter or the valve timing parameter from the first engine cycle to a second engine cycle;
    vary a phasing of combustion of a main charge of the gaseous fuel ignited by combustion of a plurality of pilot shots of the liquid fuel in the second engine cycle, based on the adjustment to the at least one of the pilot shot delivery parameter or the valve timing parameter;
    calculate a main pilot timing error; and
    perform the adjustment to the valve timing parameter based on the main pilot timing error.

10. The dual fuel engine system of claim 9 wherein the valve timing parameter includes a late intake valve closing timing, and the combustion control unit is further structured to adjust the intake valve closing timing from the first engine cycle to the second engine cycle.

11. The dual fuel engine system of claim 10 further comprising an air-fuel-ratio (AFR) control element, and the combustion control unit is further structured to adjust the AFR control element based on the intake valve closing timing.

12. The dual fuel engine system of claim 10 wherein the combustion control unit is further structured to calculate the main pilot timing error based on a difference between a main pilot timing and a target timing, and to adjust the intake valve closing timing from the first engine cycle to the second engine cycle based on the main pilot timing error.

13. The dual fuel engine system of claim 9 wherein the combustion control unit is further structured to adjust the pilot shot delivery parameter from a first main pilot timing and a first shot-to-shot fuel split in the first engine cycle to a second main pilot timing and a second shot-to-shot fuel split in the second engine cycle, based on the phasing data.

14. A method of operating a dual fuel internal combustion engine system comprising:
    producing phasing data indicative of a phasing of combustion of a main charge of a gaseous fuel ignited in a dual fuel engine by combustion of a plurality of directly injected pilot shots of a liquid fuel;
    adjusting a pilot shot delivery parameter based on the phasing data;
    varying an in-cylinder temperature in the dual fuel engine based on the adjustment to the pilot shot delivery parameter; and varying a phasing of combustion of another main charge of the gaseous fuel ignited by way of a plurality of pilot shots of the liquid fuel based on the varying of the in-cylinder temperature.

15. The method of claim 14 wherein the adjusting of the pilot shot delivery parameter based on the phasing data includes advancing or retarding a main pilot shot timing.

16. The method of claim 15 wherein the varying of the in-cylinder temperature includes varying the in-cylinder temperature in response to an adjustment to an intake valve closing timing.

17. The method of claim 15 further comprising outputting a valve timing command to adjust the intake valve closing timing from a first late closing timing to a second late closing timing.

18. The method of claim 17 wherein the second late closing timing is from 60° to 50° before a top dead center position of a piston in the dual fuel engine.

19. The method of claim 18 wherein the adjustment to the pilot fuel delivery parameter and the adjustment to the intake valve closing timing occur according to different time scales.

* * * * *